2 Sheets--Sheet 1.

F. LUEHMANN & C. ROEHL.
Trucks for Carrying Safes, &c.

No. 141,653. Patented August 12, 1873.

Witnesses  
H. F. Eberts  
Chas E. Questis

Inventors.  
Fred. Luehmann  
Carl Roehl  
per attorney  
Thos. S. Sprague

2 Sheets--Sheet 2.

F. LUEHMANN & C. ROEHL.
Trucks for Carrying Safes, &c.

No. 141,653. Patented August 12, 1873.

Witnesses.
H. F. Eberts
Chas. E. Kristis

Inventors:
Fred Luehmann
Carl Roehl
per attorney
Thos. S. Sprague

UNITED STATES PATENT OFFICE.

FREDERICK LUEHMANN AND CARL ROEHL, OF CHICAGO, ILLINOIS.

IMPROVEMENT IN TRUCKS FOR CARRYING SAFES, &c.

Specification forming part of Letters Patent No. 141,653, dated August 12, 1873; application filed June 2, 1873.

*To all whom it may concern:*

Be it known that we, FREDERICK LUEHMANN and CARL ROEHL, of Chicago, in the county of Cook and State of Illinois, have invented a new and useful Improvement in an Apparatus for Moving Heavy Objects; and we do declare that the following is a true and accurate description thereof, reference being had to the accompanying drawings, and to the letters of reference marked thereon, and being a part of this specification, in which—

Figure 1:
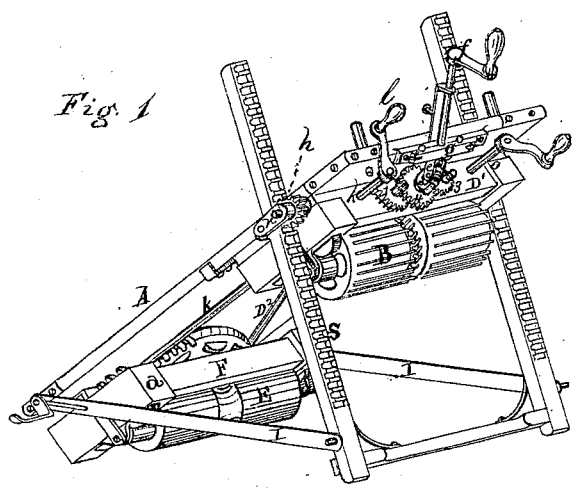
Figure 2:
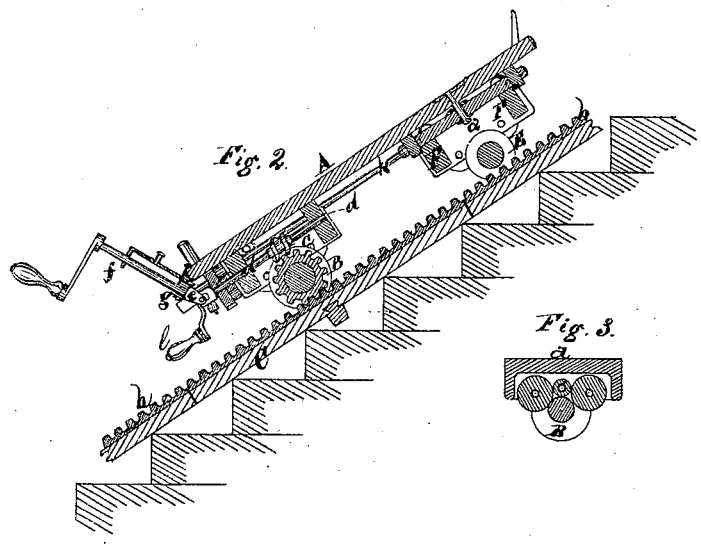
Figure 3:
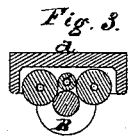
Figure 4:
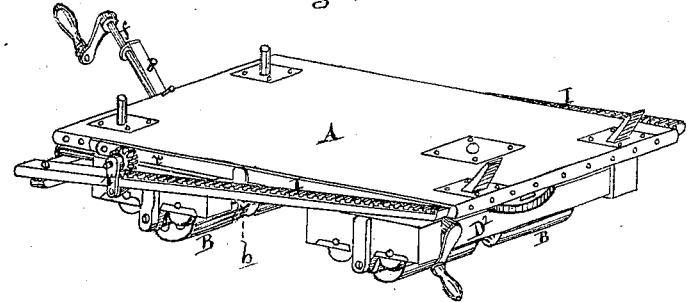
Figure 5:
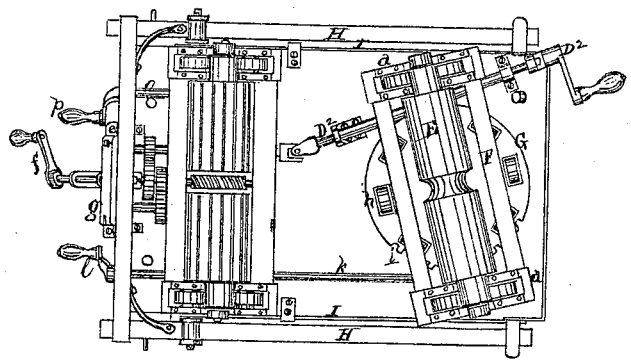
Figure 6:
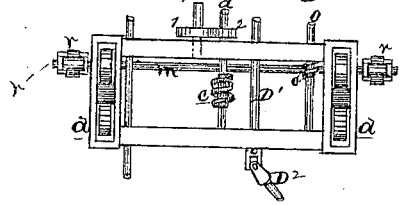
Figure 7:
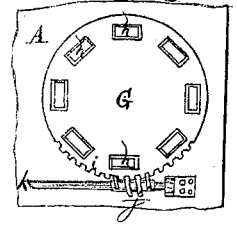

Figure 1, Sheet 1, is a perspective view of our apparatus from the rear in an inclined position ready to receive its load. Fig. 2 is a central longitudinal section of the apparatus as when being forced up a stairway. Fig. 3 is a cross-section of one of the axle-boxes taken on the line $x\ x$. Fig. 4, Sheet 2, is a perspective view of the apparatus from the top. Fig. 5 is a bottom plan of the same. Fig. 6 is a bottom plan of the frame of the main or driving drum, the said drum being removed to more fully show the worm which drives said drum and the friction-rollers which serve as its journal-bearings. Fig. 7 is a bottom plan of the turn-table of the front roller.

Like letters refer to like parts in the several figures.

This invention relates to an apparatus in the form of a low carriage or truck for moving safes, ordnance, or other heavy objects from place to place, either on level ground or up stairways or other steep inclines, and it is so arranged as to turn in close compass, the apparatus being used in connection with a portable or sectional track on which it is run. The invention consists in the peculiar construction and arrangement of the apparatus in connection with a sectional portable track having a central toothed rack, with which meshes a worm on the main drum of the truck, which worm is arranged to be driven by either of three systems of gears at as many speeds. The forward roller of the truck is journaled in a turn-table, which may be turned by a worm meshing with a rack on its edge. The apparatus is also provided with rack-braces and gearing, by which it may be raised to an inclined position to facilitate the placing on or removing of the load from its platform, the whole being arranged to operate as more fully hereinafter set forth.

In the drawing, A represents a platform, under the rear part of which a ribbed or fluted drum, B, is journaled in the anti-friction roller-boxes $a$, shown in cross-section in Fig. 3. In a groove cut in the center of the drum is a worm-gear, $b$, with which meshes a worm, $c$, on a shaft, $b$, longitudinally journaled in the frame-work under the platform. The rear end of this shaft is connected by a toggle-joint or universal coupling, $e$, with an inclined crank-shaft, $f$, working through the hinged bearing $g$ at the back end of the platform. Each rotation of the crank-shaft produces a revolution of the worm $c$, which, in turn, causes the drum B to revolve in its bearings. The truck is run on a track composed of heavy wooden planks C hinged or otherwise connected together at their ends, each plank being provided with a central worm-rack, $h$, with which the worm-gear $b$ of the drum B meshes, thus compelling the truck to advance on the track by the rotation of said drum thereon. In the transverse frame-timbers under the back end of the platform a shaft, D, is journaled, carrying a spur-gear, 1, which meshes with a pinion, 2, on the worm-shaft $d$. By placing the crank-shaft $f$ on the rear end of the shaft D the latter may be rotated thereby, and through the gear and pinion multiply the speed of the worm-shaft, and thus increase the speed or movement of the drum B. At the other side of the shaft $d$ a second shaft, $D^1$, is journaled in the framing, carrying a pinion, 3, which meshes with a spur-wheel, 4, on the shaft $d$. By placing the crank-shaft on the rear end of the shaft $D^1$ to rotate it, the worm-shaft is driven at a much slower speed, but with a correspondingly-increased force or power. The front end of the shaft $D^1$ is connected by a universal joint to a shaft, $D^2$, which extends diagonally to the front corner of the platform, where it may receive a crank for the purpose of rotating the worm-shaft $d$ from the front of the apparatus, as in moving up stairs with a heavy load. E is the forward drum of the truck, journaled in anti-friction roller-boxes $a$ in the ends of a frame, F, pendent from a turn-table, G, pivoted under the forward part of the platform. The drum E has a groove in its center to enable it to straddle the rack in the track. The turn-table has a series of rollers, $h$, radially journaled in slots near its periphery, a circular plate on the under side of the platform bearing upon them, which enables the turn-table to be comparatively easily turned, for which purpose we cut a toothed segment, $i$, on one side, with which meshes a worm, $j$, on a longitudinal shaft, $k$, provided with a crank, $l$, at the rear end of the apparatus. By turning this crank the table may be turned in either direction, carrying with it the drum E.

It will readily be seen that by using the proper gearing to rotate the worm-shaft the truck can be propelled at a speed proportionate to its load, either on level ground or up a stairway, and by the shaft $k$ and worm $j$ meshing with the worm segment on the turn-table the device can be turned in a very short radius.

To facilitate the placing of a load upon or removing it from the platform, we arrange it to tilt up in the following manner: Across the under side of the platform, through the frame and above the drum B, we journal a shaft, $m$, carrying a pinion, $n$, at each end. A longitudinal shaft, $o$, is journaled through the back end of the frame, where it is provided with a crank, $p$. This shaft $o$ also carries a worm, $o'$, which meshes with a worm-pinion (not shown) on the shaft $m$, so that the latter is rotated by turning the crank $p$. On each end of the shaft $m$ is sleeved a yoke, $r$, which embraces the pinion $n$ on the shaft. The free end of each yoke carries a roller. A pair of braces, H, connected at their lower ends are inserted in the yokes, while on the face of each brace is a toothed rack, $s$, which engages with the pinion $n$ on the shaft $m$. A pair of tie-rods, I, one at each side, are pivoted to the front ends of the platform, their rear ends being also pivoted to the lower ends of the braces H. By turning the crank $p$ to the left, the pinions $n$ of the shaft $m$ engaging with the racks of the braces H, the rear end of the platform is tilted up. A contrary movement of the crank lowers the platform, after which, by detaching the tie-rods I from the braces H, both of them may be folded along the sides of the platform being received in hooks provided for that purpose.

What we claim as our invention, and desire to secure by Letters Patent, is—

1. The combination of the platform A, roller B, worm-gear $b$, to travel on the sectional rack platform C, shaft $d$, worm $c$, crank $f$, shafts D D¹ D², gears and pinions 1 2 3 4, roller E, frame F, turn-table G having the toothed segment $i$ and rollers $h$, the shaft $k$, crank $l$, and worm $j$, arranged to operate substantially as and for the purpose set forth.

2. The combination of the shaft $m$, pinions $n$, yokes $r$ $r$, shaft $o$, worm $o'$, crank $p$, braces H H, racks $s$, and tie-rods I with the platform A, substantially as and for the purpose set forth.

FREDERICK LUEHMANN.
CARL ROEHL.

Witnesses:
  WM. H. LOTZ,
  A. HEMPEL.